United States Patent
Hinkov et al.

(12) 
(10) Patent No.: US 6,204,952 B1
(45) Date of Patent: Mar. 20, 2001

(54) BRAGG MODULATOR

(75) Inventors: Vladimir Hinkov; Iliyana Hinkov, both of Kirchzarten (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/147,774

(22) PCT Filed: Oct. 21, 1997

(86) PCT No.: PCT/EP97/05808

§ 371 Date: Mar. 5, 1999

§ 102(e) Date: Mar. 5, 1999

(87) PCT Pub. No.: WO98/18045

PCT Pub. Date: Apr. 30, 1998

(30) Foreign Application Priority Data

Oct. 22, 1996 (DE) .............................................. 196 43 489

(51) Int. Cl.[7] ...................................................... G02F 1/03

(52) U.S. Cl. .......................... 359/245; 359/252; 359/256

(58) Field of Search ................................... 359/245, 256, 359/252, 308, 305, 298, 239, 246, 248

(56) References Cited

U.S. PATENT DOCUMENTS 4,630,040 * 12/1986 Haertling .............................. 359/256
5,703,710 12/1997 Brinkman et al. ................... 359/283

FOREIGN PATENT DOCUMENTS

06110024 * 4/1994 (JP) .
96/07949 3/1996 (XH) .

OTHER PUBLICATIONS

Electric–field induced cylindrical lens, switching and deflection devices composed of the inverted domain in $LiNbO_3$ crystals, Dec. 9, 1996.*

First–order quasi–phase matched $LiNbO_3$ waveguide periodically poled by applying an external field for efficient blue second–harmonic generation, Feb. 1, 1993.*

Electro–optic wafer Beam Deflection in $Li Ta O_3$, Mar. 1996.*

Patent abstracts of Japan vol. 018, No. 387 (P–1773), Jul. 20, 1994.

M. Yamada et al., "First–Order Quasi Phase Matched $LiNbO_3$ Waveguide Periodically Poled by Applying an External Field For Efficient Blue Second–Harmonic Generation", Applied Physics Letters, vol. 62, No. 5 (Feb. 1, 1993).

(List continued on next page.)

*Primary Examiner*—Hung Xuan Dang
(74) *Attorney, Agent, or Firm*—Greenblum & Bernstein, P.L.C.

(57) ABSTRACT

A Bragg modulator modulates the intensity of a light beam, in particular of a laser beam. The Bragg modulator includes an electro-optic crystal wafer with a rectangular top face, in particular a lithium niobate or lithium tantalate crystal wafer, and a grid structure with normal zones and inversion zones. In the inversion zones, the direction of the spontaneous polarization is inverted compared to a normal direction in the normal zones. Electrodes are disposed on the top and bottom faces of the crystal wafer to generate an electric field therebetween. The grid structure is spaced apart from the front, back and side faces of the crystal wafer and is completely covered by the electrodes. The inversion zones of the grid structure are disposed at the Bragg angle ($\Theta_B$) relative to the direction of a light beam entering the front face of the crystal wafer. The entire grid structure is positioned such that the refracted light beam exits the crystal wafer on its rear face.

5 Claims, 2 Drawing Sheets

OTHER PUBLICATIONS

M. Yamada et al., "Electric–Field Induced Cylindical Lens, Switching and Deflection Devices Composed of the Inverted Domains in $LiNbO_3$ Crystals", vol. 69, No. 24 (Dec. 9, 1996).

Jun LI et al., "Electro–Optic Wafer Beam Deflector in $LiTaO_3$", Proceedings of the SPIE, vol. 2700, (Jan. 29, 1996).

* cited by examiner

BRAGG MODULATOR

BACKGROUND OF THE INVENTION

Field of the Invention

The invention is directed to a Bragg modulator that modulates, the intensity of a light beam, in particular of a laser beam. The Bragg modulator includes electro-optic crystal wafer, rectangular on its top face, in particular a lithium niobate or lithium tantalate crystal wafer. The wafer has a grid structure with normal zones and inversion zones. In the inversion zones, the direction of the spontaneous polarization is inverted compared to a normal direction in the normal zones. Electrodes are disposed on the top face and bottom face of the crystal wafer to generate an electric field therebetween.

It is known to use acousto-optic Bragg modulators for modulation of the intensity of laser beams. Such a Bragg modulator include an acousto-optic crystal, e.g., $PbMoO_4$ or $TeO_2$, and a convertor. Using the convertor, acoustic waves with a frequency of 200 to 300 MHz are excited in the acousto-optic crystal. The laser beam passing through the acousto-optic crystal is refracted by the acoustic waves, whereby with an adequately high acoustic frequency, it is possible to obtain only a refraction maximum. In this case, the angle of incidence of the optical wave on the acoustic wavefront equals the Bragg angle $\theta_B$. This is governed by the equation:

$$\sin \theta_B = 0.5 \lambda_o / \Lambda_a n$$

for an optic wavelength $\lambda_o$, an acoustic wavelength $\Lambda_a$, and a relevant crystal refractive index n. The refracted light intensity is proportional to the acoustic intensity and can be controlled with the RF power at the convertor.

The know acousto-optic Bragg modulator has, however, several disadvantages. It is difficult to obtain rapid modulation of intensity, i.e., in the nano second range, since speed is limited by the propagation velocity of the acoustic waves. The reaction time of the modulator is determined by the length of time which the acoustic wave requires to pass through the laser beam. Consequently, fast switching rates require sharp focusing of the laser beam to obtain the smallest possible path for the acoustic waves. The acoustic waves typically have a velocity $V_a$ of approximately 4000 m/s in acousto-optic crystals. For example, for a switching rate of $t_s=10$ ns, the laser beam must be focused on a spot with a diameter $D=V_a \cdot t_s=40 \mu m$. Such a requirement makes the entire system very sensitive mechanically, and special stabilization measures are needed. Limits are also imposed on focusing the laser beam insofar as an admissible light intensity must not be exceeded, since such a high energy density can result in the destruction of the crystal.

In addition, such an acousto-optic Bragg modulator requires comparatively complicated control electronics to excite acoustic waves with a frequency of 200 to 300 MHz, and also to switch this high frequency on and off very quickly.

Moreover, the production technology of the acousto-optic Bragg modulator is not planar and is thus comparatively complex and expensive. Thus, a convertor designed as a thin crystalline lithium niobate wafer must be manufactured separately and subsequently glued onto the acousto-optic crystal, which itself is comparatively expensive.

Finally, it must be noted that a high RF control power of 1 to 2 W is essential for the acousto-optic Bragg modulator. The high power may result in nonhomogeneous heating of the crystal, which, causes various instabilities.

Also known is a Bragg modulator that modulates the intensity of a light beam. This modulator includes of an electro-optic crystal wafer with a rectangular top face, and a grid structure with normal zones and inversion zones. In in the inversion zones, the direction of the spontaneous polarization is inverted compared to a normal direction in the normal zones. Electrodes are provided on the top face and bottom face of the crystal wafer. Such a Bragg modulator is shown in WO 96/07949 A1. In this Bragg modulator, the grid structure runs from the front face of the crystal wafer, into which the light beam is coupled, to the rear face, from which the unrefracted light beam passing through the grid structure exits the crystal wafer. The light beam refracted on the grid structure here strikes a side face of the crystal wafer.

Disadvantageous in this type of Bragg modulator include that the light beam exiting the side face is relatively useless, since the light beam striking a relatively small angle on the side face suffers high reflection losses (up to the total internal reflection). Because of overlapping with the unrefracted light beam, the light beam which is mostly (or entirely) reflected on this side face can moreover disadvantageously result in unwanted interference and noise.

SUMMARY OF THE INVENTION

The present invention provides a Bragg modulator which overcomes the drawbacks of the prior art.

According to the invention the grid structure is disposed spaced apart from the front, rear, and side faces of the crystal wafer and is completely covered by the electrodes, whereby the grid elements forming inversion zones of the grid structure are disposed at the Bragg angle relative to the direction of the light beam coupled into the front face in the crystal wafer. The entire grid structure is positioned such that the refracted light beam exits the crystal wafer on its rear face.

In a Bragg modular according to the present invention, the unrefracted light beam and the refracted light beam exit the rear face of the crystal wafer. The refracted light beam strikes this face at a comparatively large angle, with minimal reflection losses are small. In the electro-optic Bragg modulator according to the prior art, it is necessary to optically polish at least one of the two sides, which renders the production technology more difficult; in the Bragg modulator according to the present invention, only front and rear faces of the crystal wafer need be optically polished.

The Bragg modulator according to the present invention is also distinguished by the fact that the electrodes cover the entire grid structure, which enables full utilization of the grid.

And finally, the idea of providing the crystal wafer with a grid structure which does not run from the front to the rear face, i.e. through the entire crystal wafer, but rather is spaced apart from the side and front and rear faces brings the advantage that the problems otherwise occurring during production of the grid structure are avoided, insofar as the electrodes used for the structuring do not have to reach the edge of the crystal wafer. This avoids electrical flashovers in the edge region between these electrodes upon application of comparatively large electric fields.

Compared to acousto-optic Bragg modulators, the Bragg modulator of the present invention can be produced comparatively cost-effectively with fully planar technology. The switching speed is limited only by the capacity of the structure. Consequently, very high switching speeds may be obtained. If the Bragg modulator according to the present invention is used for modulation of the intensity of a laser beam, this beam does not have to be focused. This design is thus stable mechanically, as expensive additional stabilization measures are unnecessary. In comparison with the use of acousto-optic Bragg modulators, even higher laser powers are admissible. Moreover, the electro-optic Bragg modulator requires only relatively low RF control power with less expensive electronics. Modulation can be carried out directly with the switching frequency.

BRIEF DESCRIPTION OF THE DRAWINGS

The invention is explained in detail in the following with reference to one exemplary embodiment and an associated drawing. The figures in the drawing depict, schematically in each case.

DETAILED DESCRIPTION OF THE EXEMPLARY EMBODIMENT

Figure 1:
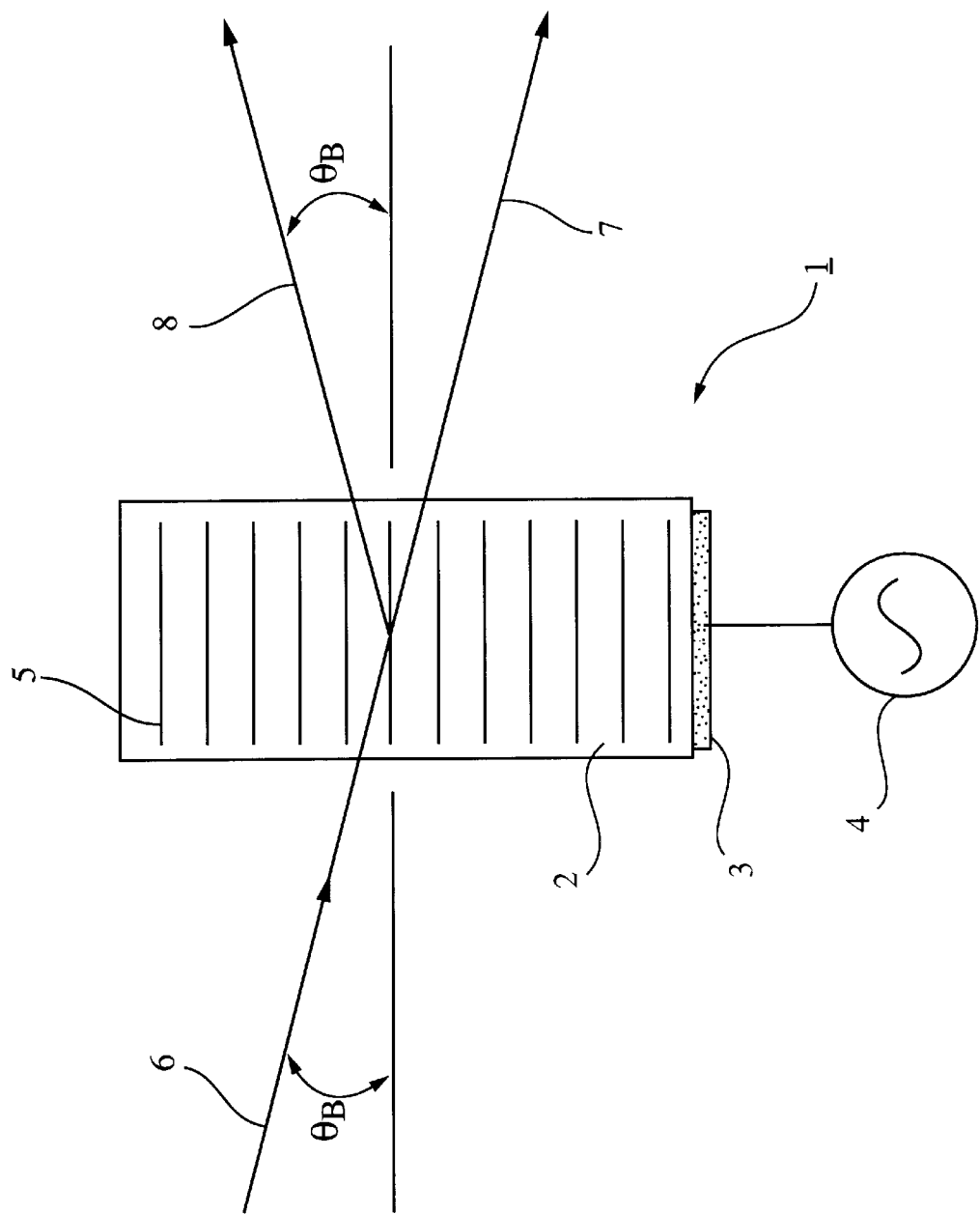
FIG. 1 an acousto-optic Bragg modulator according to the prior art.

The known Bragg modulator 1 depicted schematically in FIG. 1 consists of an acousto-optic crystal 2, e.g., made of $PbMoO_4$, or $TeO_2$, and a convertor 3 consisting, for example, of a lithium niobate wafer, which is connected to an RF source 4. When acoustic waves with a frequency on the order of 200 to 300 MHz are excited in the acousto-optic crystal 2 using the convertor 3, a laser beam passing through the acousto-optic crystal 2 is refracted by the acoustic waves. In the drawing, a laser beam 6 strikes at the Bragg angle $\theta_B$ relative to a wavefront 5 of the acoustic waves. The unrefracted laser beam 7 and the refracted laser beam 8 emerge from the opposing side. The intensity of the refracted laser beam 8 is proportional to the intensity of the acoustic waves and can be controlled with the RF power at the convertor 3. Such a Bragg modulator 1 has, however, the aforementioned disadvantages; in particular switching times on the order of 10 ns are obtainable only with comparatively high expense and shorter switching times are in not obtainable in practice.

Figure 2:
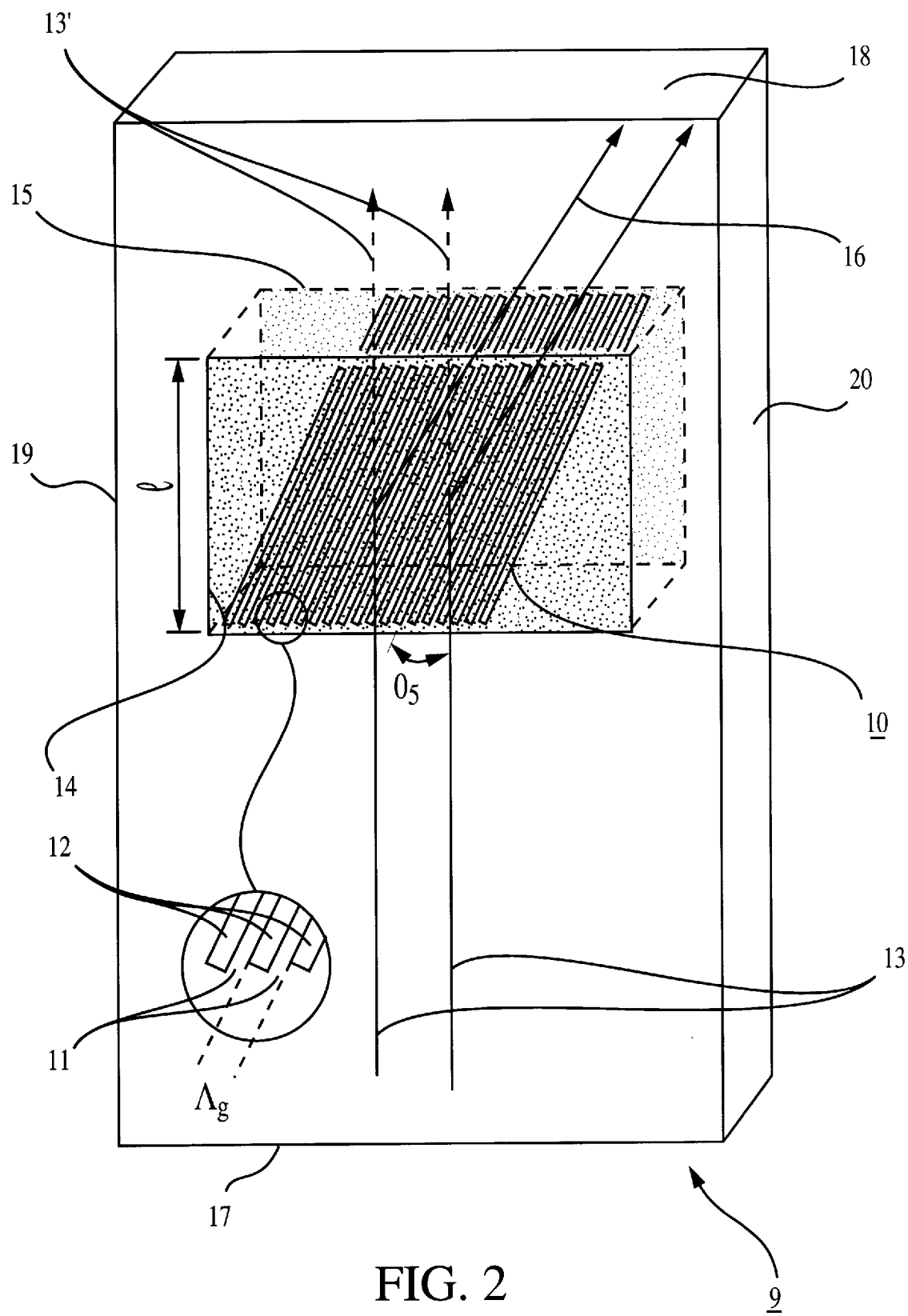
FIG. 2 an electro-optic Bragg modulator according to the invention.

The electro-optic Bragg modulator 9 according to the present invention is depicted schematically in FIG. 2 does not have these disadvantages. The Bragg modulator 9 includes an electro-optic crystal body, e.g., a lithium niobate or lithium tantalate crystal wafer, with a rectangular top. A grid structure 10 is within the body of modulator 9. The grid structure include normal zones 11 and inversion zones 12. In the inversion zones 12, the direction of the spontaneous polarization is inverted relative to a normal direction in the normal zones 11.

The inversion of the direction of the spontaneous polarization in the crystal domains can be achieved with a known process. In practice, the optical c-axis in the crystal is rotated by 180° C., locally, i.e., in specific zones. This is successful, for example, on a +Z-cut lithium niobate crystal (an inversion is then possible on a −Z-cut lithium niobate crystal) through the application of a titanium layer and subsequent heating to more than 1000° C. The depth of the inverted zone can be as much as 1 mm. The geometric shape of the inverted zone can be very precisely executed using a photolithographic structuring process.

The inversion zones 12 designed in this embodiment have the shape 8 narrow rectangles relative to the top of the crystal wafer. The normal zones 11 having the same shape lying between them are disposed such that the narrow sides of these rectangles form an angle greater than zero and less than 90° with a laser beam 13 directed into the crystal. The selected grid period of the grid structure 10 including the normal zones 11 and the inversion zones 12 is wavelength-dependent and may, for example, be 10 to 15 μm. To realize an interaction of the Bragg type, the so-called Raman-Nath factor Q must be >>1. The equation for the Raman-Nath factor is $Q=2\pi l \lambda_o / \Lambda_g^2 n$, where 1 represents the length of the interaction, $\lambda_o$ the optic wavelength, $\Lambda_g$ the grid period, and n the refractive index of the crystal. For the parameters $\Lambda_g$–$10 \cdot 10^{-6}$m; $\lambda_o$=$0.633 \cdot 10^{-6}$m, n=2.2, and 1=$6 \cdot 10^{-3}$m, which are readily realizable technically, we obtain for Q≅110, which is much mater than 1, i.e., the interaction is, as desired, of the Bragg type. To guide the light of the laser beam 13, the lithium niobate crystal wafer may be used in its full thickness or an optical waveguide may be placed in the region of the top of the crystal wafer. The grid structure 10 is completely covered by a rectangular electrode 14 applied on the top and by a rectangular electrode 15 applied on the bottom of the crystal wafer.

The grid structure is disposed in the crystal wafer such that it does not indent to any of front or back faces 17, 18 or the side faces 19, 20 of the crystal wafer.

The crystal wafer is preferably cut such that its optical axis is oriented at a right angle relative to the light propagation direction of the light beam 13 striking the front face 17 of the crystal wafer at a right angle.

When an electrical voltage is applied to the electrodes 14 and 15, refractive index changes Δn are generated as a result of the electrooptic effect in both in the normal zones 11 and in the inversion zones 12, but with opposite signs. A periodic structure, which causes refraction of the laser beam 13 directed into the front face 17 of the crystal wafer, is thus created. When the laser beam 13 strikes this periodic grid structure 10 at the Bragg angle $\theta_B$, only a single refraction maximum is observed in terms of output, and it is on the rear face 18 on the crystal wafer. The intensity of the refracted laser beam referenced as 16 in the drawing increases with the increase of Δn and is thus proportional to the voltage applied to the electrodes 14 and 15. Reference character 13' identifies the unrefracted laser beam exiting on the rear face 18 passing through the structure 10 when no voltage is being applied to the electrodes 14 and 15.

The switching speed of the Bragg modulator 9 is limited only by the capacity of the structure and can reach very high values. The capacity of the electrode $C_{el}$ is calculated with the formula:

$$C_{el}=(b \cdot l/d)\epsilon \epsilon_o$$

If one assumes that the electrode has a length of l=5 mm and a width of b=2 mm, the lithium niobate wafer has a thickness of d=0.5 mm, and $\epsilon_o$=$8.85 \cdot 10^{-12}$ F/m and $\epsilon$=30, then $C_{el}$= 5.31 $\cdot 10^{-12}$ F. For a termination resistance of R=50 Ω, one then obtains for the 3 dB bandwidth: $\Delta f_{3dB}$=1.2 GHz, i.e., the switching rate is less than 1 ns.

What is claimed:

1. A Bragg modulator, comprising:
   an electro-optical crystal wafer having a rectangular top face;
   a grid structure embedded in said wafer and spaced apart from all sides of said wafer;
   said grid structure including normal zones with a normal direction of spontaneous polarization, and inversion zones with an inverted direction of spontaneous polarization relative to said normal direction of spontaneous polarization;

top and bottom electrodes mounted on said top face and a bottom face of said wafer, respectively, said top and bottom electrodes completely covering said grid structure; and said inversion zones being oriented at a Bragg angle relative to a direction of a light beam entering a front face of said wafer;

wherein said grid structure is oriented such that a refracted light beam exits said wafer on a face thereof.

2. The Bragg modulator of claim 1, said crystal wafer comprising one of lithium niobate and lithium tantalate.

3. The Bragg modulator of claim 1, further comprising an optical waveguide disposed in said wafer in a region of said top face.

4. The Bragg modulator of claim 1, wherein a grid period of the grid structure is 10 $\mu$m to 15 $\mu$m.

5. The Bragg modulator of claim 1, wherein said wafer has an optical axis oriented at a right angle relative to a light propagation direction of said light beam incident on said front face of said wafer.

* * * * *